(12) United States Patent  
Goyal et al.

(10) Patent No.: US 8,601,139 B2  
(45) Date of Patent: Dec. 3, 2013

(54) MULTIPLE CORE SESSION INITIATION PROTOCOL (SIP)

(75) Inventors: Rajan Goyal, Saratoga, CA (US); M. Raghib Hussain, Saratoga, CA (US)

(73) Assignee: Cavium, Inc., San Jose, CA (US)

( * ) Notice: Subject to any disclaimer, the term of this patent is extended or adjusted under 35 U.S.C. 154(b) by 233 days.

(21) Appl. No.: 12/315,080

(22) Filed: Nov. 26, 2008

(65) Prior Publication Data

US 2010/0131658 A1 May 27, 2010

(51) Int. Cl.
*G06F 15/16* (2006.01)
*G06F 15/173* (2006.01)

(52) U.S. Cl.
USPC ........... 709/228; 709/227; 709/223; 709/225; 709/201; 709/202

(58) Field of Classification Search
USPC ........................................................ 709/228
See application file for complete search history.

(56) References Cited

U.S. PATENT DOCUMENTS

| | | | |
|---|---|---|---|
| 7,376,129 B2 | 5/2008 | Acharya et al. | |
| 2005/0078601 A1* | 4/2005 | Moll et al. | 370/218 |
| 2005/0094621 A1* | 5/2005 | Acharya et al. | 370/352 |
| 2006/0007900 A1* | 1/2006 | Sylvain | 370/338 |
| 2008/0046745 A1* | 2/2008 | Buch et al. | 713/176 |
| 2008/0126549 A1* | 5/2008 | Khanchandani et al. | 709/227 |
| 2008/0137690 A1* | 6/2008 | Krantz et al. | 370/503 |
| 2008/0175229 A1 | 7/2008 | Lee | |
| 2008/0176597 A1 | 7/2008 | Bantukul | |
| 2008/0298362 A1* | 12/2008 | Ben-Dvora et al. | 370/390 |
| 2009/0055899 A1* | 2/2009 | Deshpande et al. | 726/4 |
| 2009/0092131 A1* | 4/2009 | Hu et al. | 370/356 |
| 2009/0262724 A1* | 10/2009 | Suzuki et al. | 370/352 |
| 2009/0323692 A1* | 12/2009 | Li et al. | 370/392 |
| 2010/0077084 A1* | 3/2010 | Gao et al. | 709/227 |
| 2010/0118742 A1* | 5/2010 | Ezell | 370/261 |

FOREIGN PATENT DOCUMENTS

EP 2079024 * 10/2007

* cited by examiner

*Primary Examiner* — Rupal Dharia
*Assistant Examiner* — Mohammed Ahmed
(74) *Attorney, Agent, or Firm* — Hamilton, Brook, Smith & Reynolds, P.C.

(57) ABSTRACT

A Session Initiation Protocol (SIP) proxy server including a multi-core central processing unit (CPU) is presented. The multi-core CPU includes a receiving core dedicated to pre-SIP message processing. The pre-SIP message processing may include message retrieval, header and payload parsing, and Call-ID hashing. The Call-ID hashing is used to determine a post-SIP processing core designated to process messages between particular user pair. The pre-SIP and post-SIP configuration allows for the use of multiple processing cores to utilize a single control plane, thereby providing an accurate topology of the network for each processing core.

14 Claims, 5 Drawing Sheets

MULTIPLE CORE SESSION INITIATION PROTOCOL (SIP)

BACKGROUND

A communication network may be described as a geographically distributed collection of nodes interconnected by communication links and segments for transporting messages (e.g., data, voice, video) between communication units (end nodes), such as personal computers, certain telephones, personal digital assistants (PDAs), video units and the like. Many types of communication networks are used within the art, with the types ranging from local area networks (LANs) to wide area networks (WANs). LANs may connect nodes over dedicated private communications links located in the same general geographical location, such as a building or campus. WANs, on the other hand, may connect large numbers of geographically dispersed nodes over long-distance communications links, such as common carrier telephone lines. The Internet is an example of a WAN that may connect networks throughout the world, providing global communication between nodes on various networks. The nodes may communicate over the network by exchanging discrete frames or packets of data according to predefined protocols, such as the Transmission Control Protocol/Internet Protocol (TCP/IP). In this context, a protocol is a set of rules defining how the nodes interact with each other.

Communication networks are increasingly being used to transport many forms of information including, e.g., voice and video information. There are many protocols defined to allow information (e.g., voice traffic) over a network designed to transport traditional data traffic. One such protocol is voice-over-internet protocol (VoIP).

VoIP refers to a group of technologies that may be used to transmit e.g., voice information over communication networks from a source (calling party) to a destination (called party). Such networks typically include a plurality of agents that convert e.g., voice and/or video information from its traditional form to a form that is suitable for packet transmission. Specifically, the agent encodes, compresses and encapsulates the information into a plurality of data packets that are suitable for being carried by the communication network. Examples of agents include IP telephones, VoIP network interfaces, certain private branch exchanges (PBXs), personal computers (PCs) running communication applications, certain personal digital assistants (PDAs), network devices providing voice gateway services and so on.

In certain communication networks, such as VoIP networks, a session protocol is typically employed to establish a session (connection) that supports a call between a calling party and a called party. An example of a session protocol that is commonly used is the well-known Session Initiation Protocol (SIP) which is described in J. Rosenberg et al., "SIP: Session Initiation Protocol," Internet Engineering Task Force (IETF) Request For Comments (RFC) 3261. SIP may operate at the application layer of the OSI-RM and is defined to establish and maintain sessions between endpoints (e.g., SIP-based telephones) in a communication network.

In accordance with SIP, endpoints may be referred to as User Agents (UAs). When a UA comes on-line, it typically registers with a registration service, called a policy data point (PDP), using a SIP "register" (REGISTER) command. The PDP maintains information about the UA which may include its location, how to reach it and authentication information associated with the UA that may be used to authenticate the UA. Typically, after a UA is registered, the UA is available to receive as well as initiate calls.

When a call is initiated by a calling party to a called party, a session is typically established between the calling and called parties' UAs to support the call. Establishing a session between the parties typically involves (a) authenticating both parties and (b) successfully exchanging a sequence of messages between the parties in a predetermined manner. Authentication typically involves ensuring the parties have permission to establish a call in the network. The sequence of messages typically includes (a) an invite (INVITE) message issued by the calling party to initiate the session between the calling and called parties, (b) an acknowledgement (OK) message issued by the called party to acknowledge the "invite" message and indicate the called party accepts participation in the session, followed by (c) an acknowledgement (ACK) message issued by the calling party to acknowledge the called party's acceptance. After the session is established, a channel may then be established to transfer media traffic between Users agents and associated with the session. A protocol that is often used to establish a channel in a VoIP network is the Real-time Transport Protocol (RTP) described in H. Schulzrinne et al., "RTP: A Transport Protocol for Real-Time Applications," IETF RFC 3550.

SUMMARY

In many prior art systems, a session between parties is typically established by processing SIP messages with the use of a monolithic control plane code running on a single core CPU. Specifically, a single PBX software package may be utilized by a single core proxy server processing multiple SIP messages associated with distinct media sessions. Thus, in order to improve processing speed, the processing frequency of the single core CPU is maximized. The solution of maximizing the processing frequency of the single core CPU is limited due to current hardware capabilities, therefore CPU frequency maximization may no longer provide a practical solution. The use of a multi-core CPU may aid in increasing processing speeds, however running multiple instances of the PBX software package may provide an incomplete network topology for each of the individual instance. Thus, a combined hardware solution (e.g., the use of multiple core) and a software solution is needed to improve processing speeds while maintaining a complete network topology for each core of the multi-core CPU.

In example embodiments, a multi-core processing system is presented. The system may include a receiving core that may be configured to receive a protocol signal. The receiving core may also be configured to hash an identification value associated with the protocol signal. The receiving core may further be configured to direct the protocol signal based on the hashed identification value. The system may also include a plurality of processing cores, where a processing core of the plurality may be configured to receive the protocol signal based on the hashed identification value. The processing core may also be configured to further process the protocol signal.

The receiving core and the plurality of processing cores may be configured to process the protocol signal based on a Session Initiation Protocol (SIP). The plurality of processing cores may be configured to process a plurality of incoming protocol signals in parallel and with a single copy of a control software process. The control software process may be a private branch exchange (PBX), a SIP Media Gateway processor, or a SIP Proxy server.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

It should be noted, illustrated embodiments, described herein, are described as using the Session Initiation Protocol (SIP) to establish and maintain sessions in a communication network as well as exchange information in the network. A version of the SIP protocol that may be used exampled embodiments is described in J. Rosenberg et al., "SIP: Session Initiation Protocol," RFC 3261, June 2002, available from the Internet Engineering Task Force (IETF) and is incorporated by reference in its entirely as though fully set forth herein. It should be noted that other query/response protocols, such as the Simple Object Access Protocol (SOAP), Hypertext Transfer Protocol (HTTP), File Transfer Protocol (FTP), Simple Mail Transfer Protocol (SMTP), or other VoIP protocols like Media Gateway Control Protocol (MGCP), H.323 etc. may take advantage of aspects of the example embodiments presented herein.

Figure 1:
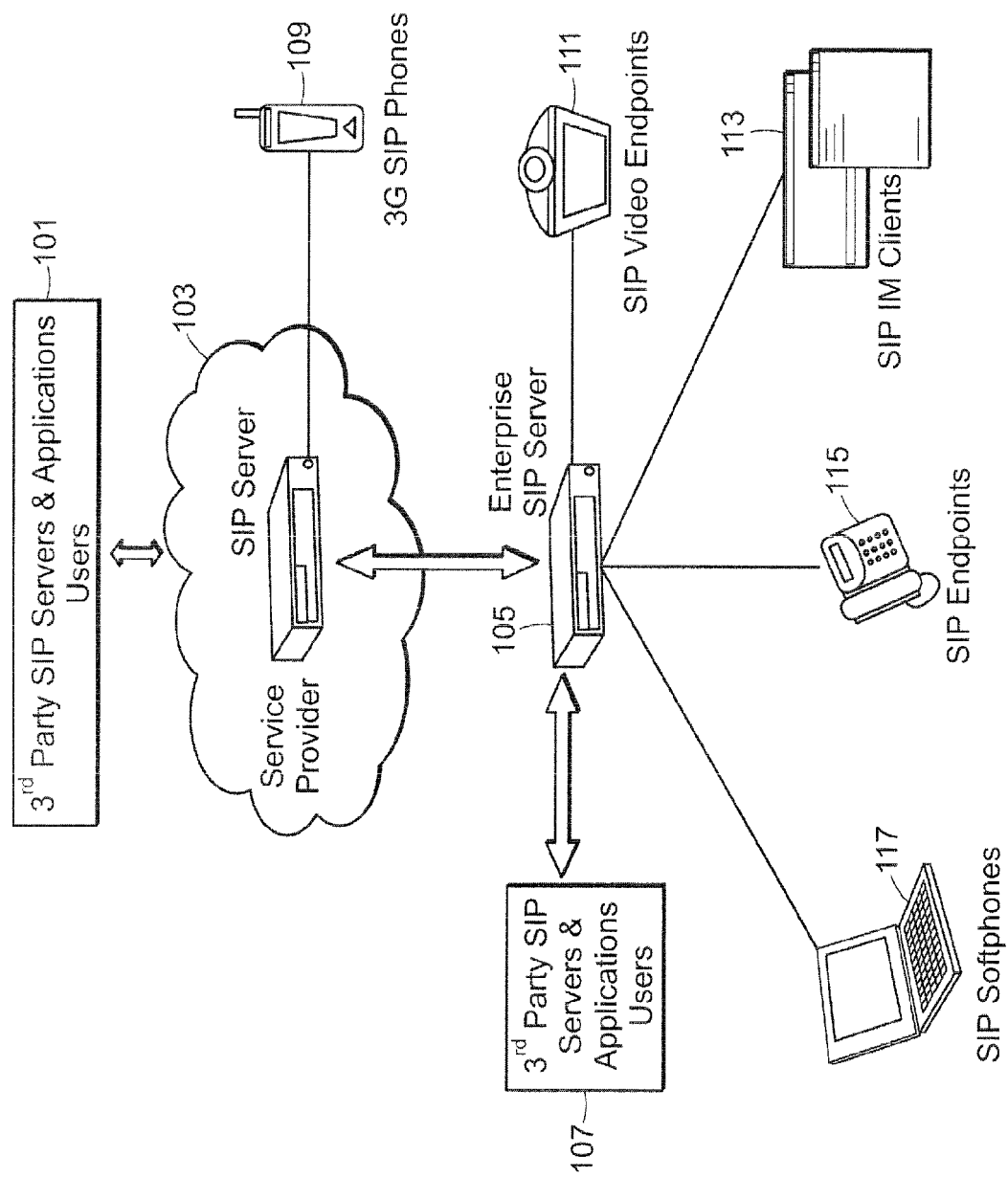
FIG. 1 is a schematic of a Session Initiation Protocol (SIP) based network.

FIG. 1 provides an illustrative example of a Session Initiation Protocol (SIP) based network. Any number of users, third party SIP servers and applications 101 may be included in the network. These users 101 may connected to a SIP proxy server 103 that may be configured to accept and interpret any incoming SIP messages and transmit outgoing SIP messages. The SIP proxy server 103 may be in connection with any number of other SIP proxy servers, for example server 105, in order to transmit or receive SIP messages from other users, third party SIP servers and applications 107, which may not be in connection with SIP proxy server 103. The various proxy servers may be used by various users to establish an initial connection, where the various users may eventual receive a direct connection to participate in a media session.

It should be appreciated that a user may be provided in a variety of forms. For example, cell phones, video clients, instant messaging (IM) clients, landline phones, and softphones or laptops 109-117, respectively. It should be appreciated that the connections illustrated in FIG. 1 may be wireless, optical, landline, or any other form of network connections known in the art.

In establishing a direct call, or media session, between two users, multiple SIP messages may be sent through the network via SIP proxy servers. Generally, the processing of SIP messages may be defined by four stages. In a first stage a SIP message is received. In a second stage, the header fields of the SIP message, as well as the message payload, are parsed. In a third stage, flow lookups are performed and new calls, or messages, are created. In a fourth stage, SIP messages are processed or transmitted.

Figure 2:
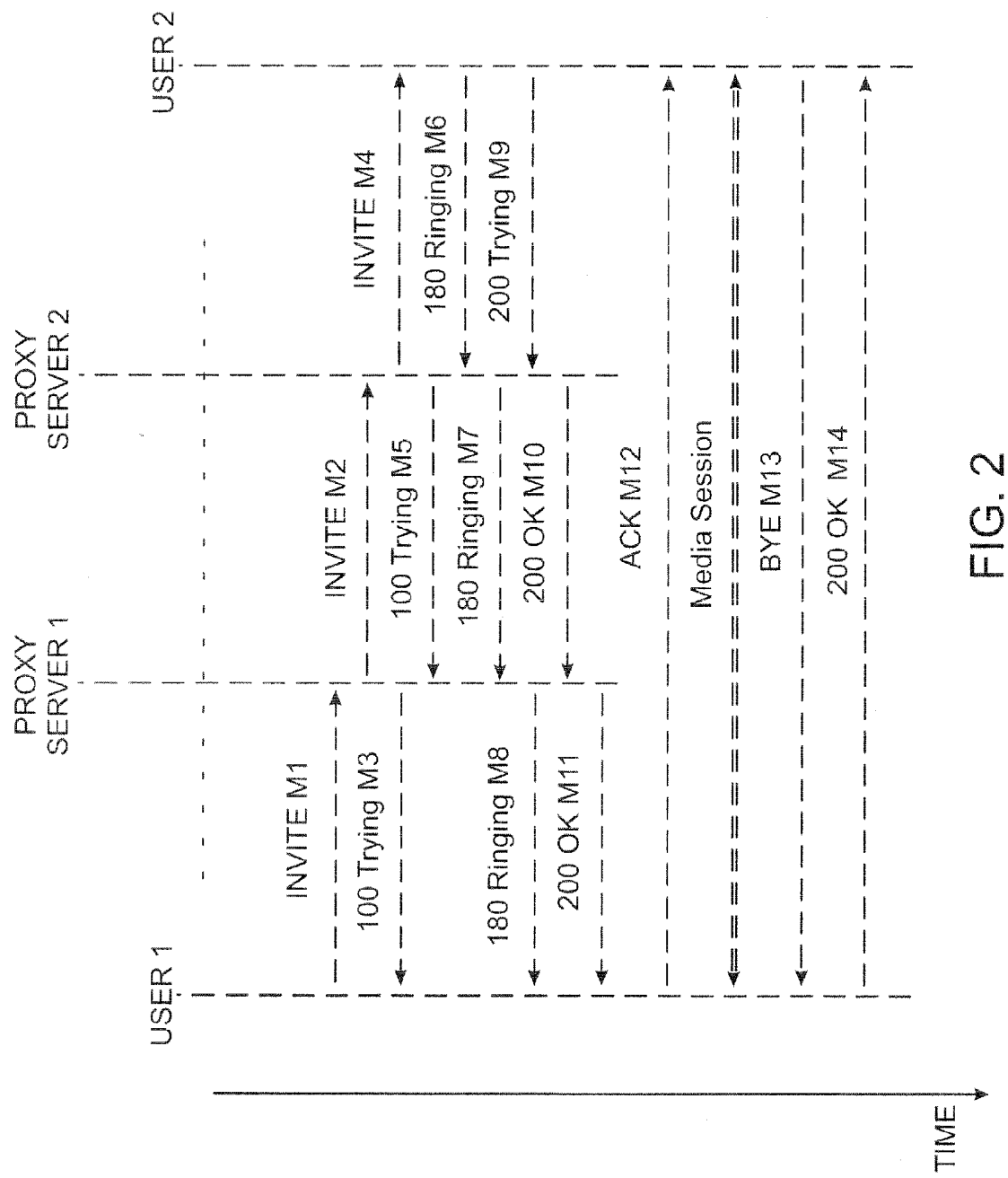
FIG. 2 is a schematic of SIP messages that may be sent and received during a voice-over-internet protocol (VoIP) communication.

FIG. 2 provides an example of a session between two users (USER 1 and USER 2) attempting a voice-over-internet (VoIP) communication in a SIP based network. USER 1 is within communication range of a first proxy server, SERVER 1. Thus, USER 1 is configured to receive and transmit messages to SERVER 1. Similarly, SERVER 1 is within communication range of a second proxy server, SERVER 2. Thus, SERVER 1 and SERVER 2 may transmit and receive SIP messages to one another. SERVER 2 is within communication range of USER 2, and may therefore transmit and receive messages from USER 2. Therefore, through the use of SERVER 1 and SERVER 2, USER 1 and USER 2 may send and transmit SIP messages to one another in order to establish a direct communications connection.

Transmitted and received messages are illustrated as horizontal dashed lines in FIG. 2. The messages in FIG. 2 are vertically arranged with respect to time. Thus, a first message which appears in a plane above a second message, is transmitted or received before the second message. Furthermore, the messages of FIG. 2 are also numbered (M#) in order of the time received, with messages labeled with lower numbers being received before messages labeled with higher numbers.

In the example illustrated in FIG. 2, USER 1 initiates a message session with USER 2. The message session may be initiated by sending an invite message (INVITE M1) to SERVER 1. The invite request may include a number of header fields. Header fields may be named attributes that provide additional information about a message.

For example, a header field may include a unique identifier for the call. A unique identifier may be used to identify all incoming and outgoing messages associated with the media session between USER 1 and USER 2. SERVER 1 may be used to simultaneously process SIP messages for any number of users or applications at any one give time, thus the unique identifier may aid in determining which SIP messages are associated with a particular media session. The unique identifier may be in the form of a Call-ID that may globally identify all messages between two users, thus defining a peer-to-peer relationship. Header fields may also include the destination address (e.g., the address of USER 2), a sending address (e.g., the address of USER 1), and any information about the type of session that USER 1 wishes to establish with USER 2.

Upon receiving the invite message (INVITE M1), SERVER 1 may process and evaluate the header fields of the message INVITE M1. SERVER 1 thereafter sends an invite message (INVITE M2) to SERVER 2. After SERVER 1 sends the INVITE M2 message, SERVER 1 also sends a TRYING M3 message to USER 1. The trying response (TRYING M3) indicates that the initial invite message (INVITE M1) has been received and that SERVER 1 is working on behalf of USER 1 to route the invite message to the requested destination.

Upon receiving the second invite message (INVITE M2), SERVER 2 may process and evaluate the header fields of the message INVITE M2. SERVER 2 thereafter sends an invite message (INVITE M4) to USER 2. After SERVER 2 sends the INVITE M4 message, SEVER 2 also sends a TRYING M5 message to SERVER 1 indicating the INVITE M4 message has been sent to USER 2.

Once USER 2 receives the INVITE M4 message, USER 2 will be alerted, for example, via a ringing similar to that of a phone. USER 2 sends a ringing message (RINGING M6) to SERVER 2 to indicate that USER 2 is being alerted. SERVER 2 thereafter sends a ringing message (RINGING M7) to SERVER 1, which in turn sends a ringing message (RINGING M8) to USER 1. After accepting the call, USER 2 sends a permissive acknowledgement (OK M9) response to SERVER 2, which in turn sends an OK M10 response to SERVER 1. SERVER 1 thereafter sends an OK M11 response to USER 1 indicating that the call is accepted. The OK responses M9-M11 may include a header field including an address at which USER 1 may directly connect with USER 2, thereby bypassing the use of proxy SERVERS 1 and 2 and establish a direct media session.

Upon receiving the final OK M11 response, USER 1 sends an acknowledgement message ACK M12 directly to USER 2, thereby promoting the start of the call or media session. During the media session, media packets may be sent back and forth between USER 1 and USER 2 using the format agreed upon in the initial invite messages (INVITE M1, M2 and M4).

In the example provided by FIG. 2, USER 2 ends the session by generating an ending message (BYE M13) and sending the ending message directly to USER 1. USER 1 thereafter sends a permissive acknowledgment response (OK M14) directly to USER 2, which confirms the receipt of the ending message (BYE M13) and terminates the session.

Typically, proxy servers, such as SERVER 1 and SERVER 2, include single core CPU systems utilizing a monolithic control plane code. Specifically, a single PBX software process is used by the single core CPU to process SIP messages. Thus, in an effort to increase processing capacity/throughput of SIP messaging, the current trend is to rely on hardware solutions to improve the processing frequency of the single core CPU. Demand for an increase in capacity of a SIP server may come from the increase in number of new users to be handled by single SIP Server, instead of introducing additional servers to handle new users.

Latest CPU industry trends have resulted in CPUs having hit the frequency ceiling, and hence new CPUs have multiple cores at lower frequency. This may result in higher million-instructions-per-second (MIPS) throughput for a whole chip but lower single thread MIPS throughput. That means in order to design higher capacity servers, software cannot just rely on higher speed CPUs. It may need to be innovative to take advantage of multiple cores. This may involve:

a) Writing optimized code to get maximum single thread throughput.
b) Providing application architecture to run multiple instances of the optimized code on different cores and still not lose the advantages of equivalent single thread implementation.
c) Architect the application in such a way that adding extra cores to next generation CPUs should let applications scale to new throughputs. Effectively, in the same way current applications get a performance boost with higher frequency CPUs without the need of any software changes. This is in sync with the industry trend of CPUs, as next generation CPUs are going to have more number of cores generation after generation. So application architectures should be ready to take advantage of it without much (ideally zero) changes in software.

It is important to mention that the suggestion of running multiple instances of a same application (like one per extra core) does not work for many stateful applications like an SIP server. An SIP server may be identified as a stateful application because each instance maintains a state per USER session, and processing of subsequent messages depend on current state of the USERs involved in the session. Thus, an application may not simply run N instances of an SIP server without compromising on point b) above. Specifically, all instances (or cores) should be able to see the state of all the users currently being serviced. That means in pure software terms, text section can be replicated N times (per for each code) but data section should be shared. In order to satisfy requirement for above point c), (i.e., adding more cores should scale the overall performance accordingly), it is not possible to just have a traditional way of sharing a data section because each instance will have a critical section for accessing the data section and it will serialize the processing on different cores rather than running in parallel.

Thus, a need exists for a multi-core CPU SIP server, which is capable of maintaining complete topology of the telephony network. Thus, a multi-core CPU system capable of processing SIP messages with a single PBX process is needed.

Figure 3:
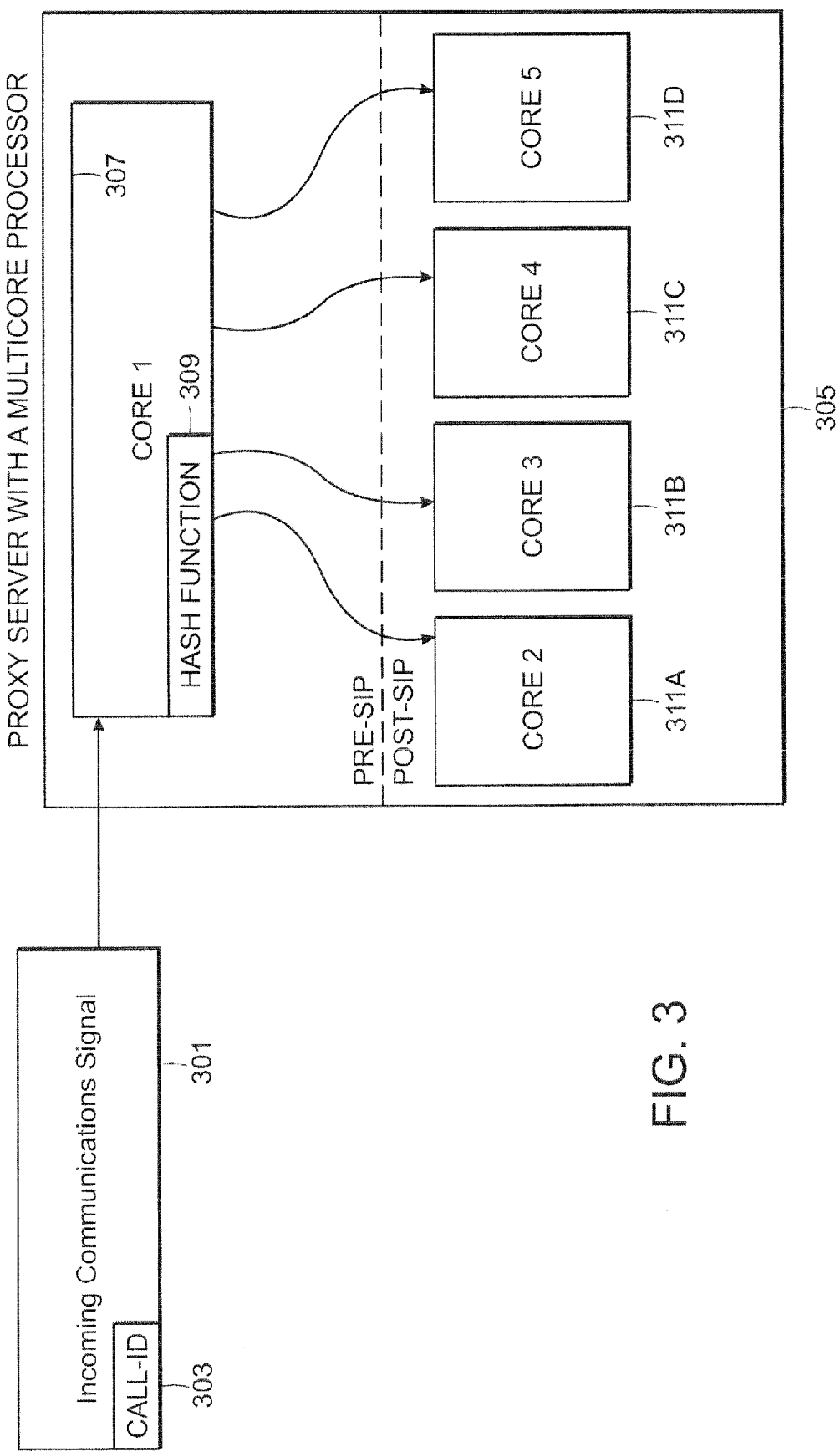
FIG. 3 is an overview schematic of a message processing system featuring a multi-core processor according to example embodiments.

FIG. 3 illustrates an example embodiment which provides a combined hardware and software solution of increasing processing capacity/throughput of SIP messages. The embodiment of FIG. 3 includes a multi-core CPU proxy server 305, where each core 307 and 311A-311D maintains a current and accurate network topology.

Of the four stages involved in processing a SIP message, stages two through four are the most intensive in terms of processing time and required system resources. Therefore, stages two through four may benefit from the use of multiple and core independent PBX processes. In contrast, stage one requires less processing time and system resources. Therefore, stage one processing may not necessarily benefit from utilizing a multiple and core independent PBX process. Thus, in an example embodiment the SIP processing may be defined as pre-SIP (including stage one) and post-SIP (including stages two through four).

Since pre-SIP processing does not require significant processing time or resources, a single core may dedicated for performing pre-SIP processing for all incoming signals of the proxy server 305. In the example provided by FIG. 3, CORE 1 is dedicated to pre-SIP processing.

Since post-SIP processing may require significant processing time and resources, post-SIP processing may be run independently throughout the remaining cores of the multi-core system. In the example provided by FIG. 3, CORE 2, CORE 3, CORE 4, and CORE 5 are dedicated to post-SIP processing, with each core 311A-311D running a separate and independent post-SIP PBX process (e.g., stages two through 4).

However, a problem may still exist in determining which post-SIP core is to process SIP messages associated with a particular call or media session. Thus, according to example embodiments, in determining which core is performing post-SIP processing for all messages associated with a particular media session, a hash function may be utilized as part of the pre-SIP processing.

The dedicated pre-SIP core may include a hash function. The Call-ID associated with each SIP message may be used as an input to the hash function, where the resulting hash value may indicate the address of the post-SIP core processing messages which are all associated with a same call or media session.

A hash function is deterministic, therefore if two hash values generated from the same hash function are different, the two input values to the hash function must also be different. Based on this logic, a hash function never provides a false negative (e.g., the hash value, of a Call-ID associated with an incoming message, will always correctly provide the identification of the post-SIP core processing messages associated with a same media session).

Therefore, as illustrated in the example provided by FIG. 3, an incoming signal 301, may be sent to a multi-core processor

305. A first core 307 (CORE 1) of the processor 305 may be dedicated to pre-SIP processing where all the header fields of the signal 301 may be analyzed and a Call-ID 303 of the incoming signal 301 may be retrieved. The Call-ID 303 associated with the message 301 may be input into a hash function 309 in order to determine which of the remaining post-SIP cores 311A-311D (COREs 2-5) have been dedicated to processing messages of a same call associated with a particular Call-ID. Once a hash value, or core address has been obtained, CORE 1 will send the incoming signal 301 to the designated post-SIP core for further processing. It should be appreciated that a multi-core processor may include any number of cores dedicated for pre-SIP and post-SIP processing.

Figure 4:
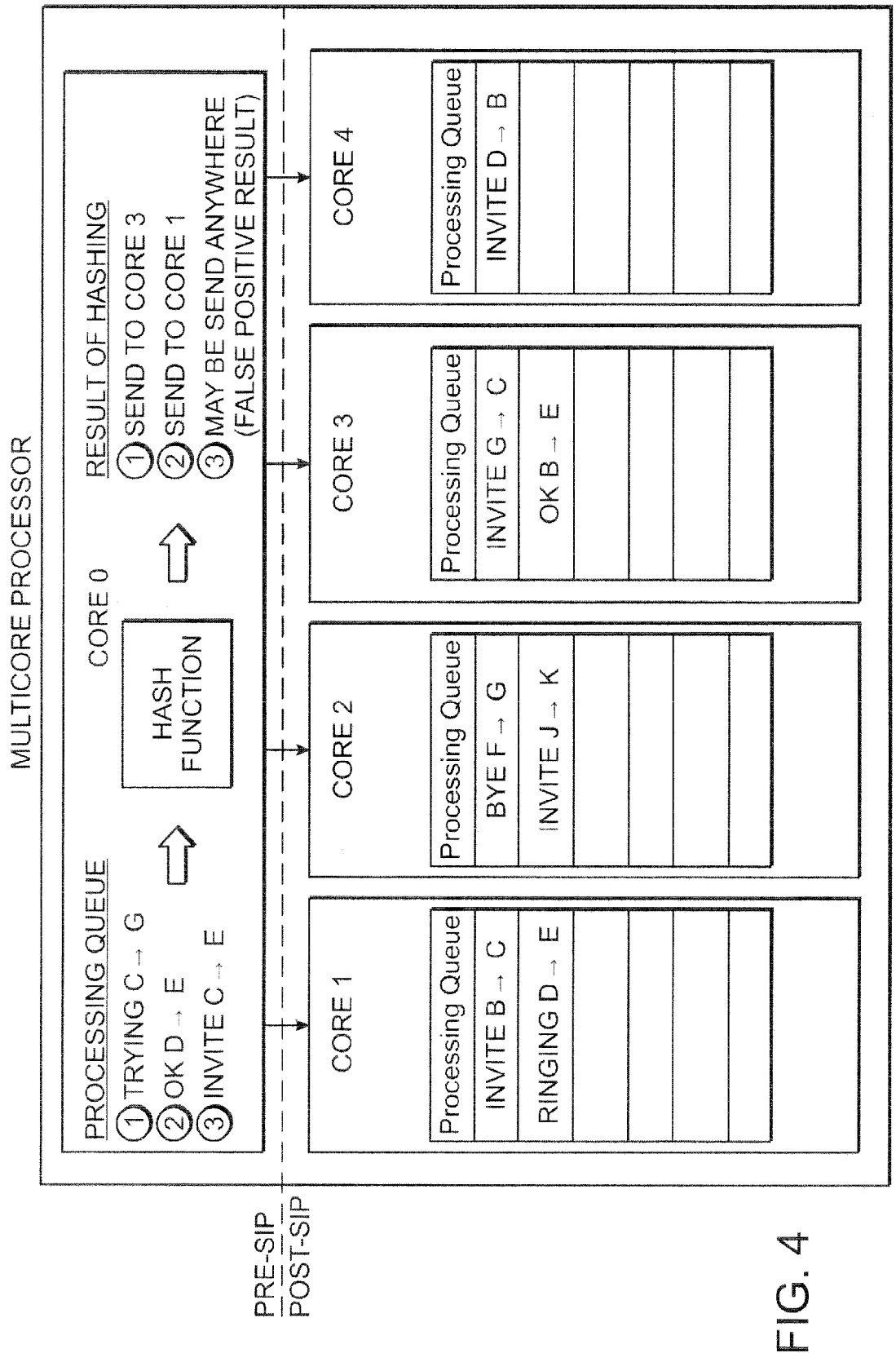
FIG. 4 is schematic of the multi-core processor of FIG. 3 processing example SIP messages according to example embodiments.
Figure 5:
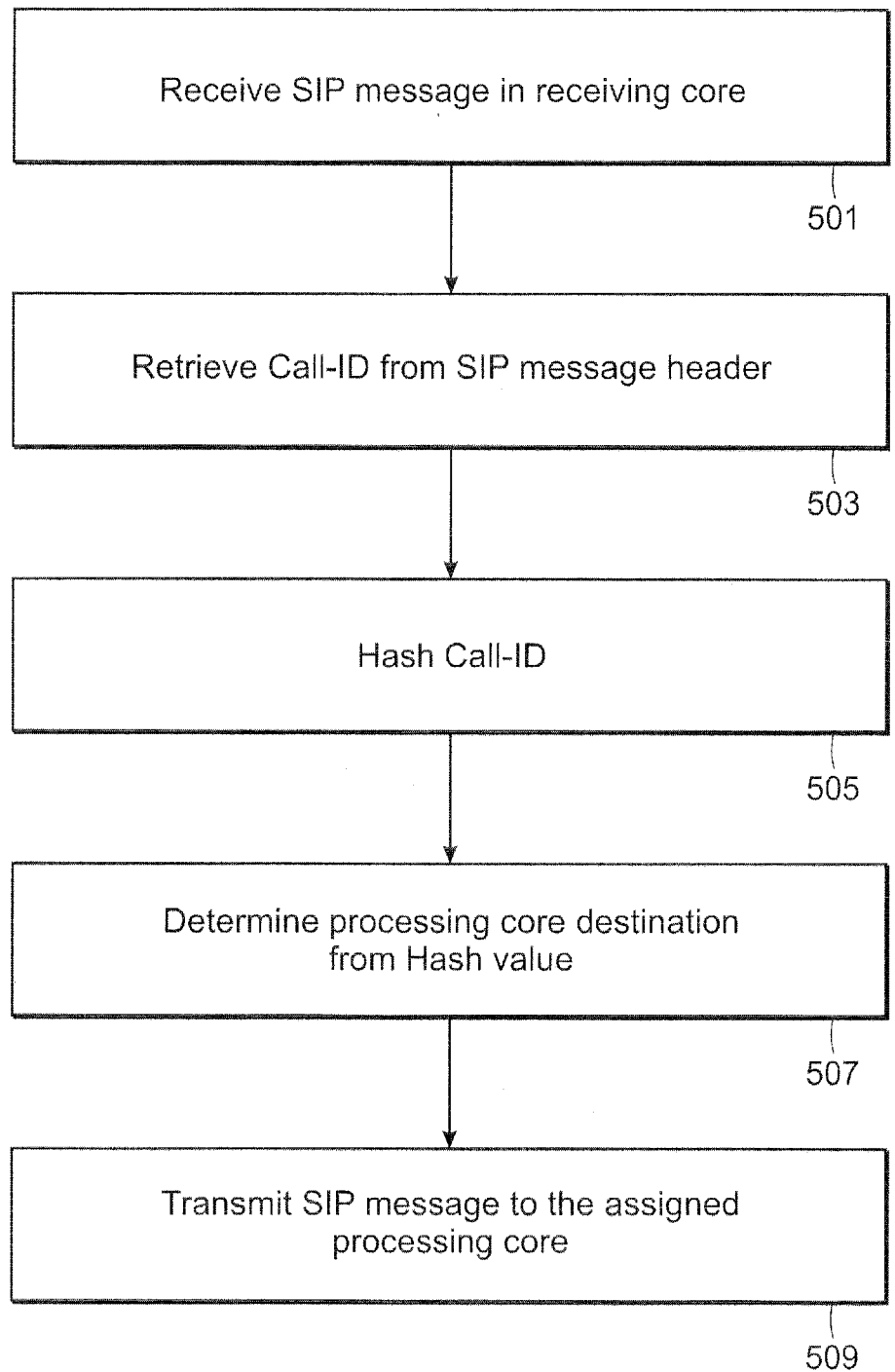
FIG. 5 is a flow diagram of operational steps taken by the multi-core processor of FIGS. 3 and 4 according to example embodiments.

FIG. 4 provides an illustrative example of a proxy server featuring a multi-core CPU and FIG. 5 is a flow diagram of an example operation according to embodiments presented herein. As shown in FIG. 4, CORE 0 is dedicated to pre-SIP message processing, whereas CORE 1, CORE 2, CORE 3, and CORE 4 are dedicated to post-SIP message processing. The post-SIP processing cores all include a processing queue filled with SIP messages to be processed.

As shown in the provided example, CORE 1 is currently processing messages between USER B and USER C. CORE 1 is also processing messages between USER E and USER D. CORE 2 is processing messages between USER F and USER G, as well as messages between USER J and USER K. CORE 3 is processing messages between USER G and USER C, as well as messages between USER B and USER E. CORE 4 is processing messages between USER D and USER B.

The pre-SIP processing core, CORE 0, may also include a processing queue used to store all received incoming messages (FIG. 5, 501). The first incoming message in the processing queue of CORE 0 is a TRYING message between USER C and USER D. Upon retrieving this message from the processing queue, CORE 0 may retrieve the Call-ID from the message and input the Call-ID in the hash function (FIG. 5, 503 and 505). Note that CORE 3 is currently processing an INVITE message from USER G to USER C. Since a hash function is not capable of providing false positives, the resultant hash value obtained from the Call-ID of the first message stored in the request queue of CORE 0 will provide the address of CORE 3 (FIG. 5, 507). CORE 0 thereafter transmits the first message in the request queue to CORE 3 for further processing (FIG. 5, 509).

Upon transmitting the message, CORE 0 may proceed to process and retrieve the Call-ID of the second message stored in the processing queue, which is an OK message sent from USER D to USER E (FIG. 5, 503). CORE 0 thereafter sends the Call-ID associated with the second message to the hash function (FIG. 5, 505). Note that CORE 1 is currently processing a RINGING message from USER D to USER E, therefore the hash value provided by the hash function will provide the address of CORE 1 (FIG. 5, 507). No other post-SIP cores, besides CORE 1, will process messages between USER D and USER E. All incoming messages between USER D and USER E will be transmitted to CORE 1 (FIG. 5, 509).

CORE 0 thereafter retrieves the third message from the processing queue, which is an INVITE message from USER C to USER E. CORE 0 retrieves the Call-ID from the third message and hashes the Call-ID with use of the hash function (FIG. 5, 503 and 505). Note that there are no post-SIP processing cores which are currently processing messages between USER C and USER E. Therefore, the resulting hash value may provide the address of any one of the post-SIP cores. However, once the message between USER C and USER E has been transmitted to a particular post-SIP processing core, all subsequent messages between USER C and USER E will be transmitted to the same core (FIG. 5, 507 and 509).

Thus, through the use of a multi-core CPU, processing time of SIP messages may be reduced without relying on the frequency capability of an individual core and without losing visibility of the topology of the network.

Each instance of the Post-SIP processing module uses a shared common flow state. Since each core is working on an independent set of calls/sessions, in the example embodiment, there will be zero contention among cores for accessing a flow state. A flow state can be maintained as hash table and same hashing function (as used by the pre-SIP module for load balancing) may be used for accessing it. This may make the data path processing code of post-SIP processing module lock-less. This may also help in scaling performance as extra cores are allocated for the post-SIP processing module.

Another advantage of this example embodiment is that all the post-SIP modules need not worry about (i.e., no instructions are executing for) processing interrupts for incoming packets or receiving packets. This is because the pre-SIP module handles the packet receive functionality. This makes the per core Icache and Dcache usage more effective and optimized.

The example embodiments presented herein are explained in context of an SIP server. It should be appreciated the example embodiments may be applied to SIP media gateway, SIP proxy, or SIP back-to-back user agent etc. Furthermore, it is also applicable to other request/response protocol processing.

It should be understood that the multi-core SIP embodiments, disclosed herein, may be implemented by a computer using instructions implemented in hardware, firmware, or software. If implemented in software, the software may be stored on any form of computer readable medium, such as random access memory (RAM), read only memory (ROM), compact disk read only memory (CD-ROM), and so forth. In operation, a general purpose or application specific processor loads and executes the software in a manner well understood in the art.

While this invention has been particularly shown and described with references to example embodiments thereof, it will be understood by those skilled in the art that various changes in form and details may be made therein without departing from the scope of the invention encompassed by the appended claims.

What is claimed is:

1. A method for processing a protocol message, the method comprising:
    in a receiving core of a multi-core processor, the receiving core configured to perform pre-SIP processing of protocol messages:
    given a plurality of different media sessions between users, for each of the media sessions, analyzing a protocol message sent to the receiving core in order to determine an associated call identifier, wherein the call identifier uniquely identifies protocol messages, including the protocol message being analyzed, associated with one of the media sessions, wherein for each media session, all corresponding protocol messages are identified by a single respective call identifier;
    hashing the call identifier with a hash function at the receiving core in order to determine a processing core from a plurality of processing cores in the multi-core processor, the processing cores configured to perform post-SIP processing of protocol messages; and directing the protocol message analyzed to the processing core determined, wherein for each media session, all the corresponding protocol messages are directed to a single respective processing core of the plurality of processing cores in the multi-core processor.

2. The method of claim 1 wherein the call identifier is included in a heading of the protocol message.

3. The method of claim 1 further including processing a plurality of protocol messages on respective processing cores in parallel and with a single copy of a control software process.

4. The method of claim 3 wherein the control software process is a private branch exchange (PBX) process, a SIP Media Gateway processor, or a SIP Proxy server.

5. A hardware multi-core processing system comprising:
   a receiving core dedicated to pre-SIP processing of protocol messages, the receiving core configured to receive a protocol message and to hash a call identifier associated with the protocol message, the receiving core further configured to direct the protocol message based on the hashed call identifier,
   wherein given a plurality of different media sessions between users, for each of the media sessions, the call identifier uniquely identifies protocol messages, including the protocol message being directed, associated with one of the media sessions, wherein for each media session, all corresponding protocol messages are identified by a single respective call identifier; and
   a plurality of processing cores configured to perform post-SIP processing of protocol messages, where a processing core of the plurality of processing cores is configured to receive the protocol message based on the hashed call identifier, the processing core configured to further process the protocol message, wherein for each media session, all the corresponding protocol messages are received by a single respective processing core.

6. The system of claim 5 wherein the plurality of processing cores are configured to process a plurality of incoming protocol messages in parallel and with a single copy of a control software process.

7. The system of claim 6 wherein the control software process is a private branch exchange (PBX), a SIP Media Gateway processor, or a SIP Proxy server.

8. The system of claim 5 wherein the call identifier is included in a header of the protocol message.

9. A method for processing protocol messages, the method comprising:
   receiving a plurality of protocol messages sent to a receiving core, the receiving core configured to perform pre-SIP processing of protocol messages;
   given a plurality of different media sessions between users, for each of the media sessions, analyzing the protocol messages at the receiving core in order to determine an associated call identifier, wherein the call identifier uniquely identifies protocol messages, including the protocol messages being analyzed, associated with one of the media sessions, wherein for each media session, all corresponding protocol messages are identified by a single respective call identifier;
   directing the protocol messages, based on the call identifier, to respective processing cores from a plurality of processing cores, the processing cores configured to perform post-SIP processing of protocol messages, the receiving core and the plurality of processing cores being located within a same multi-core processor; and
   processing the protocol messages in respective processing cores in a parallel manner, where each processing core operates within a single control plane, wherein for each media session, all the corresponding protocol messages are directed to a single respective processing core.

10. The method of claim 9 wherein the single control plane is a private branch exchange (PBX), a SIP Media Gateway processor, or a SIP Proxy server.

11. A hardware multi-core processing system comprising:
    a receiving core dedicated to pre-SIP processing of protocol messages, the receiving core configured to receive a protocol message, the receiving core further configured to direct the protocol message for further processing based on a call identifier associated with the protocol message, wherein-given a plurality of different media sessions between users, for each of the media sessions, the call identifier uniquely identifies protocol messages, including the protocol message being directed, associated with one of the media sessions, wherein for each media session, all corresponding protocol messages are identified by a single respective call identifier; and
    a plurality of processing cores, the processing cores configured to perform post-SIP processing of protocol messages, where a processing core of the plurality of processing cores is configured to receive the protocol message based on the call identifier, the plurality of processing cores configured to process incoming protocol messages in parallel and under a single control plane, wherein for each media session, all the corresponding protocol messages are received by a single respective processing core.

12. The system of claim 11 wherein the single control plane is a private branch exchange, a SIP Media Gateway processor, or a SIP Proxy server.

13. The system of claim 11 wherein the receiving core includes a hash function configured to hash the call identifier to determine which processing core of the plurality of processing cores to send the protocol message.

14. A non-transitory computer-readable medium storing instructions for processing a protocol message that, when executed by a computer, cause the computer to:
    given a plurality of different media sessions between users, for each of the media sessions, analyze a protocol message sent to a receiving core in order to determine an associated call identifier, the receiving core dedicated to pre-SIP processing of protocol messages, wherein the call identifier uniquely identifies protocol messages, including the protocol message being analyzed, associated with one of the media sessions, wherein for each media session, all corresponding protocol messages are identified by a single respective call identifier;
    hash the call identifier with a hash function at the receiving core in order to determine a processing core from a plurality of processing cores in the multi-core processor, the processing cores configured to perform post-SIP processing of protocol messages; and
    direct the protocol message to the processing core determined, wherein for each media session, all the corresponding protocol messages are directed to a single respective processing core of the plurality of processing cores in the multi-core processor.

\* \* \* \* \*